Patented Apr. 1, 1947

2,418,138

UNITED STATES PATENT OFFICE 2,418,138

PAINT REMOVER COMPOSITION

Howard Packer, Dayton, Ohio

No Drawing. Application March 31, 1945,
Serial No. 586,015

3 Claims. (Cl. 252—144)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to paint removers, and in general aims to provide a paint, varnish, enamel and lacquer remover which will be effective, rapid in action, relatively inexpensive, easy to prepare, and which will have satisfactory keeping qualities, especially in metal containers. Paint removers are highly useful when camouflaging coats must be removed from aircraft and other vehicles, but previously used paint removers have been objectionable in that they do not adhere well to curved or inclined surfaces, are too volatile and require too much scraping or scrubbing after application. The present invention provides a paint remover which will adhere to all sorts of surfaces, will not evaporate for some time and will so effectively loosen the paint or other coating that it may be flushed away by a stream of water.

I am aware that paint removers employing acetone with cellulose acetate and acetone (or methyl-ethyl-ketone) with paraffin wax have been suggested, as in the Dosselman et al. Patent No. 1,113,964 dated October 20, 1914, the Klinkenstein Patent No. 1,974,744 dated September 25, 1934, and the Ellis et al. Patent No. 2,327,701 dated August 24, 1943.

In accordance with the invention, the following liquid constituents are mixed in any desired order:

|  | Parts by weight |
|---|---|
| Acetone | 53.5 |
| Ethylene dichloride | 25.0 |
| Water | 10.0 |
| Lactic acid | 3.5 |

The acetone preferably has the characteristics specified in Federal specification No. O–A–51. Together with the ethylene dichloride, it may be replaced by methyl-ethyl-ketone, but it is preferred over the latter because methyl-ethyl-ketone is more expensive. The ethylene dichloride is preferably of a commercial grade. The lactic acid also is preferably commercial, of specific gravity 1.2.

To the above liquid mixture, the solids listed below are added, in any desired order or together if desired:

|  | Parts by weight |
|---|---|
| Paraffin wax | 1.0 |
| Cellulose acetate | 3.0 |
| Sulfonated castor oil | 3.0 |
| Diamylamine phosphate | 1.0 |

It will be observed that the parts by weight in the above tables when added total 100.0, so that percentages by weight are given.

The cellulose acetate is "commercial high viscosity," and its effect is to make the liquid viscous, so that it will adhere to surfaces, even inclined surfaces, and flow smoothly and evenly. The paraffin wax forms a film on the surface of the liquid which greatly reduces volatilization of the solvents. Apparently it is partly emulsified by the sulfonated castor oil and thus made compatible with the other ingredients, but appears also to be partly dissolved and partly suspended. The sulfonated castor oil should conform to the following requirements:

| Total fatty acid | 50% minimum |
|---|---|
| Combined $SO_3$ | 3.5% minimum |
| Total alkali as $K_2O$ | 3.0% minimum |
| pH of 1.0% solution | 6.8–8.5 |
| Metallic base | Potassium |

Instead of sulfonated castor oil I may use other emulsifying and wetting agents, for example dioctyl sodium sulfosuccinate. The diamylamine phosphate serves as a corrosion inhibitor for metals, and is desirable in the event some of the paint remover is not removed completely from metal surfaces and crevices. It may be incorporated in the remover by the separate addition of diamylamine (57.5% by weight of the commercial grade) and orthophosphoric acid (42.5% by weight of 85% commercial grade). If a corrosion inhibitor is omitted, the amount of water present may be increased to 11.0%, or some other adjustment may be made in the above percentages, as will be obvious to those skilled in the art. Other alkyl-amino-phosphates may be used in lieu of diamylamine phosphate.

The lactic acid is a very important active ingredient in the above described compound, because it enhances greatly the paint-removing action. If the lactic acid were omitted, the compound would have only a small fraction of the effectiveness which it has with lactic acid.

The wax may be dissolved separately in part of the ethylene dichloride and then added slowly with stirring. This will obviate heating. However, heating may be resorted to if desired. It may also be convenient to dissolve the cellulose acetate by soaking it in the ketone, before adding to the liquid mixture.

The paint remover may be used by brushing or spraying it over any surface from which paint, varnish, lacquer or enamel is to be removed. After a short period of standing the paint, etc., layer will be loosened and wrinkled, or else softened, and the layer may be removed by flushing the surface with a moderately strong stream of water (as from a hose) while scraping with a spatula or scrubbing with a brush.

My paint remover is but slightly corrosive to aluminum and tin, or to completely immersed iron, but gradually attacks partly immersed iron. However it can be kept in iron containers for long periods by displacing the air in such containers above the surface of the liquid with carbon dioxide gas, and then sealing the container. The carbon dioxide gas is conveniently added by displacing the air above the surface of the liquid with a blast of compressed carbon dioxide gas, or by dropping a piece of "dry ice" on top of the liquid, which will quickly evolve sufficient vapor to displace the air, which being much lighter will escape through the filling opening, and then sealing the same.

Among the advantages of the described paint remover are, the fact that it will act more rapidly than most paint removers, will remove coatings which resist ordinary paint removers, will loosen coatings so that they may be removed in sheets, will adhere even to inclined surfaces, and will not corrode or will but slightly corrode some of the more common metals. A particular feature is that the paint remover makes it possible to flush away the loosened paint by a hose or stream of water, thus minimizing labor.

It will be understood that the proportions of the above ingredients may be varied somewhat, and as indicated above, the diamylamine phosphate or other corrosion inhibitor may be omitted entirely. It is unnecessary that cellulose acetate be used as chemical equivalents may yield the same result.

What I claim is:

1. A composition for removing paint and the like from surfaces consisting of the following ingredients in approximately the following parts by weight: acetone 53.5; ethylene dichloride 25.0; water 11.0; lactic acid 3.5; paraffin wax 1.0; cellulose acetate 3.0; and sulfonated castor oil 3.0.

2. A composition for removing paint and the like from surfaces which is characterized by little corrosive action on the more common metals, consisting of the following ingredients in approximately the following parts by weight: acetone 53.5; ethylene dichloride 25.0; water 10.0; lactic acid 3.5; paraffin wax 1.0; cellulose acetate 3.0; sulfonated castor oil 3.0; and diamylamine phosphate 1.0.

3. A composition for removing paint, said composition comprising a liquid constituent and solid constituents distributed through the liquid constituent, said liquid constituent comprising by weight about one-half acetone, about one-quarter ethylene dichloride, about one-tenth water and about three-hundredths lactic acid; there being distributed through said liquid constituent paraffin wax, about one-hundredth; cellulose acetate, about three-hundredths; a compatible wetting agent, about three-hundredths and diamylamine phosphate, one hundredth.

HOWARD PACKER.

REFERENCES CITED

The following references are of record in the file of this patent:

UNITED STATES PATENTS

| Number | Name | Date |
| --- | --- | --- |
| 1,147,849 | Ellis | July 27, 1915 |
| 1,113,971 | Ellis | Oct. 20, 1914 |
| 1,000,162 | Ellis | Aug. 8, 1911 |
| 1,993,096 | Hodges | Mar. 5, 1935 |

FOREIGN PATENTS

| Number | Country | Date |
| --- | --- | --- |
| 468,769 | British | 1937 |

OTHER REFERENCES

Chemical Formulary, Bennett. Chemical Publishing Company, N. Y., 1939, vol. 4, pages 339 and 342.